United States Patent [19]

Morgan

[11] 4,073,647
[45] Feb. 14, 1978

[54] PREPARATION OF CERMETS

[75] Inventor: Chester S. Morgan, Oak Ridge, Tenn.

[73] Assignee: The United States of America as represented by the United States Department of Energy, Washington, D.C.

[21] Appl. No.: 680,606

[22] Filed: Apr. 26, 1976

[51] Int. Cl.² .............................................. B22F 1/04
[52] U.S. Cl. .................................. 75/235; 428/539.5
[58] Field of Search ............... 75/206, 212, 211, 224, 75/235; 29/182.5; 428/539.5

[56] References Cited

U.S. PATENT DOCUMENTS

| | | | |
|---|---|---|---|
| 2,952,535 | 9/1960 | Roake | 75/206 |
| 3,044,867 | 7/1962 | Edstrom | 75/0.5 |
| 3,069,292 | 12/1962 | Alexander et al. | 75/206 |
| 3,143,789 | 8/1964 | Iler | 29/182.5 |
| 3,158,473 | 11/1964 | Gatti | 75/206 |
| 3,192,042 | 6/1965 | Spacil | 75/206 |
| 3,698,891 | 10/1972 | Patil et al. | 75/212 |
| 3,964,878 | 6/1976 | Scheithauer, Jr. | 75/212 |

*Primary Examiner*—Brooks H. Hunt
*Attorney, Agent, or Firm*—Dean E. Carlson; Stephen D. Hamel; John B. Hardaway

[57] ABSTRACT

Cermets are produced by the process of forming a physical mixture of a ceramic powder material with an elemental metal precursor compound and by decomposing the elemental metal precursor compound within the mixture. The decomposition step may be carried out either prior to or during a forming and densification step.

1 Claim, No Drawings

PREPARATION OF CERMETS

BACKGROUND OF THE INVENTION

This invention was made in the course of, or under, a contract with the Energy Research and Development Administration. It relates generally to the arts of ceramics and metallurgy and, more particularly, to the art of cermets.

Within the prior art various techniques have been used to form cermets. Cermets as used within this disclosure are defined as composite materials composed largely of a ceramic substance but with sufficient amount of metal and with metal distribution such as to make a continuous metal matrix. A cermet can be construed as a three dimensional metal foil structure the spaces of which are filled with ceramic material. A simple prior art technique for forming cermets is by physically mixing a ceramic powder and an elemental metal powder. The mixture is normally pressed into a desirable shape and then densified by sintering. Another technique is infiltration wherein a ceramic form is dipped into a molten metal pool such that the pores within the ceramic article are filled with the liquid metal by virtue of the capillary attraction. These techniques form cermets which are generally capable of having a continuous metal phase throughout the entire structure. The retention of this capability, however, greatly limits the geometry and the lower limit of the metal content of the resulting article.

Another technique for forming cermets is by coating ceramic powders with a metal by chemical vapor deposition. By this process the individual powders become coated with the elemental metal of interest and can then be formed into a suitably shaped article. This technique assures the presence of a continuous metal phase throughout the article. The process of chemical vapor deposition, however, requires that all of the powder particles be within a very limited size range so that the vapor deposition process can be carried out in a fluidized bed. If a mixture of ceramic compositions is utilized the various powders must be of similar density to fluidize uniformity.

SUMMARY OF THE INVENTION

It is thus an object of this invention to provide a novel process for producing cermets.

It is a further object of this invention to provide a process for producing cermets wherein a continuous metallic phase may be provided with lesser metal content than was required by prior art processes.

It is a still further object of this invention to provide a process for producing cermets which is applicable to a very wide range of particle sizes and densities.

These as well as other objects are accomplished by a process wherein a physical mixture of ceramic particles and an elemental metal precursor compound is formed and the precursor compound is decomposed within the mixture to produce the elemental metal. By the decomposition of the precursor compound, the ceramic particles are coated with the elemental metal derived from the precursor compound. A sintered cermet article can be produced either simultaneously with, or subsequent to, the decomposition step.

DETAILED DESCRIPTION

In accordance with this invention, it has been found that cermet articles can be produced with a continuous metallic phase throughout the entire article while utilizing only a small percentage of metal. The process is carried out by mixing a ceramic powder with a decomposable elemental metal precursor compound and by decomposing the precursor compound within the mixture. This decomposition produces metallic coating on the individual ceramic grains. By the process of this invention a cermet having as little as 2 volume percent metal can be produced with a continuous metallic phase throughout the entire volume of the cermet. Coating of the ceramic particles from the decomposition of an elemental metal precursor compound is virtually insensitive to the grain sizes and densities of the ceramic particles.

As used within this disclosure the term "decomposable elemental metal precursor compound" means a compound which is either thermally or chemically decomposable to produce an elemental metal or a mixture of elemental metals or alloys which are in the uncombined state. Thermally decomposable compounds suitable for use in this invention are those which decompose at moderate temperatues, i.e., less than 1200° C, to produce the elemental metal and a gaseous phase which leaves the cermet environment. Chemically decomposable compounds are those which, when in the presence of a reducing or oxidizing atmosphere, decompose to form the elemental metal and a gaseous product which escapes the cermet environment.

Virtually any ceramic material is useful for producing a cermet in accordance with the process of this invention. In particular, the following ceramic materials may be used to form a cermet in accordance with this invention:

aluminum oxide, magnesium oxide, calcium oxide, the oxides of iron, europium oxide, zirconium oxide, stabilized zirconium oxide, thorium oxide, the oxides of uranium, the oxides of niobium, nickel oxide, beryllium oxide, silicon dioxide, tantalum oxide, cobalt oxide, cuprous oxide, magnesia-alumina spinel, tungsten trioxide, chromium oxide, tin oxide and manganese oxide.

It is understood that this listing of ceramic materials is not meant to be limiting but merely illustrative of the ceramic materials which are useful for cermets in accordance with this invention. Generally, all ceramic materials can be used to produce a cermet in accordance with the process of this invention.

Elemental metal precursor compounds which are thermally decomposable to produce elemental metal in accordance with this invention are listed in Table I below along with the approximate temperature of decomposition in an inert atmosphere.

Table I

| Compound | Approximate Decomposition Temperature |
| --- | --- |
| $TaH_{0.5}$ | 700° C |
| $UH_3$ | 650° C |
| $ZrH_2$ | 750° C |
| $ThH_2$ | 850° C |
| $W(CO)_6$ | 450° C |
| $ReCl_3$ | 600° C |

Elemental metal precursor compounds which are chemically decomposable to produce a cermet in accordance with this invention are listed in Table II below along with the preferred environment and temperature of decompositon.

Table II

| Compound | Atmosphere | Approximate Temperature |
| --- | --- | --- |
| $PtCl_4$ | Hydrogen | 700° C |
| $CoCl_2$ | Hydrogen | 700° C |
| $WO_3$ | Hydrogen | 850° C |
| $MoO_3$ | Hydrogen | 800° C |
| $ReCl_3$ | Hydrogen | 500° C |

The particle size of the beginning materials has some effect upon the cermet eventually produced. Preferably a particle size for the oxide ceramic material is within the range of 1 to 500 micrometers. The particle size for the elemental metal precursor material is preferably within the range of 0.1 to 2 micrometers with larger sizes producing less uniform coatings. The particle size of the ceramic powder can, of course, be varied to produce the desired metal layer spacing and the desired degree of densification. The mixing of small particles and large particles can be utilized to give an advantageous balance of densification and metal matrix distribution. If a cermet of mixed ceramic materials should be desired, ceramic particles of different densities can be used in the process of this invention without the need for special precautions.

Some precursor materials are advantageously applied to the ceramic powders by contacting the ceramic powders with a solution containing precursor solutes. Aqueous solvents are preferred but other solvents such as alcohol may be utilized. Chlorides in particular can be applied from a concentrated aqueous solution. For example, platinum tetrachloride and cobalt dichloride can be applied in this manner. In such a case, it is usually preferred to decompose the precursor compound prior to a densification step since the escape of the volatile chloride in the form of hydrochloric acid could possibly damage a cermet article if pressure were applied. In other instances, however, when a thermally decomposable compound is utilized there is no objection to carrying out the decomposition step while the article is in a sintering environment.

The cermet article produced in accordance with this invention is preferably prepared by hot pressing, Sintering, however, without the application of pressure may also be used to form a cermet article. Other conventional densification techniques such as heating by the application of direct current through the article may be used where the precursor compound has been decomposed prior to the formation of an article.

Having generally described the process of this invention the following specific examples are given as a further aid to the understanding thereof. Within the examples, emphasis is given to the use of europium oxide as a ceramic material. It is to be understood, however, that any ceramic material could have been used to illustrate the process of this invention and that the formation of europium oxide cermets is for illustrative purposes only.

EXAMPLE I

Monoclinic europium sesquioxide powder obtained from crushed hot pressed pellets was heated in argon at 1800° C for 1 hour to assure dense individual particles. The particles had a size within the range of 50 to 200 $\mu M$. The europia powder was blended with precursor compounds by tumbling in a glass bottle. In some cases amyl acetate was added to facilitate adherence and uniform mixing of the powders. Cermets of europia and tantalum were made by blending europia with tantalum hydride, $TaH_{0.5}$, having a particle size of less than three micrometers. The blended powder mixture was hot pressed at 6000 psi and 1430° C in vacuum within a graphic die. The tantalum hydride decomposed leaving a thin film matrix of tantalum in the hot pressed specimen. Cermets of 2.5, 5, 10 and 20% by volume of tantalum were produced in this manner.

A europia-tantalum cermet with a tantalum content of 2.5 volume percent was electrically conductive indicating the presence of a continuous tantalum phase. Additional experiments were run wherein the hydride was decomposed by heating a loose powder mixture of 10 wt. % to 40 wt. % $TaH_{0.5}$ to 1000° C within a vacuum prior to hot pressing at 1430° C for 30 minutes. Cermets produced in this manner had properties nearly identical to the properties of the cermets produced by decomposing simultaneously with a densification step of hot pressing.

EXAMPLE II

Cermets composed of europia-tungsten were made by the thermal decomposition of tungsten carbonyl, $W(CO)_6$. Volatility of the decomposable compound tungsten carbonyl was a problem and required rapid heating to a temperature above the decomposition temperature. The well mixed powders were heated in an atmosphere of argon to 1000° C in 1½ minutes with a loss of about 30% of the tungsten content through volatilization. The remaining tungsten was evenly distributed over the europia particles except in the center of the mass where the metal coating was thinner.

Thermal conductivity measurements were made on europia 10 volume percent tungsten samples obtained by hot pressing the europia powder coated from the above technique. The value obtained at room temperature was 6.98 watts per meter per ° K which is about one-half of that expected if all of the tungsten present contributed to the thermal conductivity (i.e., the europia did not contribute). The ratio of electrical conductivity at the ice point and 4.2° K indicated that the continuous tungsten metal phase was reasonably pure and that it was not adversely affected by impurities. Therefore, the loss in thermal conductivity was attributed to imperfect distribution of the metal matrix so that part of the matrix did not contribute to the thermal conductivity.

EXAMPLE III

Cermets of europia-tungsten were prepared by reducing tungsten trioxide with hydrogen. This technique, however, was less satisfactory than that reported in the prior example. The hydrogen environment at 1000° C caused the europia to interact with the tungsten and resulted in a cermet with a large proportion of the tungsten distributed as fine particles.

EXAMPLE IV

Cermets of molybdenum and europia were prepared by reducing molybdenum oxide with hydrogen within a mixture containing europia particles. After hot pressing the cermet had a uniform distribution of molybdenum but there was evidence of the molybdenum being partly distributed in the europia as fine particles.

EXAMPLE V

Cermets of alumina and tungsten were prepared by mixing alumina and tungsten trioxide and reducing the tungsten trioxide with hydrogen. Reduction at 1000° C in a 650 mm Hg (torr) hydrogen environment resulted in evenly distributed metallic films on the alumina powder with no distribution of fine particles of tungsten in the $Al_2O_3$.

EXAMPLE VI

Platinum and cobalt coatings were deposited on zirconia stabilized with 12M% yttria having a particle size within the range of 10 to 300 micrometers. The powder was contacted with a 35 wt.% and 25 wt.%, respectively, aqueous solution of platinum tetrachloride and cobalt dichloride. In each case small amounts of concentrated aqueous solution were applied to the oxide powders by application with an eye dropper. The solution coated particles were dried over night at room temperature then additionally dried for 1 hour at 110° C. Particles were heated slowly to 1000° C in an atmosphere of hydrogen. Visual observation revealed that the particles were uniformly coated. Scanning electron microscopy indicated metallic coating on the individual particles along with some webbing. Webbing was attributed to a lack of particle agitation during drying of the chloride solution. It is thus preferred to agitate particles coated from an aqueous solution during the drying process.

The resulting metal coated particles when mounted for metallographic polishing exhibited a tendency for pull-out during polishing. Small cracks between the ceramic and the mounting of plastic occurred in some places where the metal coating was removed. Typical metal width and crack width were three micrometers although isolated sections had thicknesses up to about 12 micrometers. The metal matrix layers were densified and strengthened during hot pressing to a final product.

It is thus seen that the cermets produced in accordance with this invention have greatly increased coefficients of thermal conductivity as compared to the pure ceramic materials. The articles are much less brittle than the ceramic articles and thus do not tend to crack or chip as do the pure oxide ceramics. Cermets produced by the process of this invention can tolerate very rapid temperature changes without cracking even during nuclear irradiation. The process of this invention produces enhanced uniformity of metal matrix and produces a continuous metal phase with less metal than was heretofore possible. The exact reason for this is not entirely understood but is felt to be caused by a greatly enhanced metal surface diffusion during the decomposition reaction which tends to produce a highly uniform metal matrix.

Cermets produced in accordance with the process of this invention have a wide and varied utility. The europium oxide cermets as described in the above examples are extremely useful as neutron absorbers in a nuclear reactor environment. Cermets of yttria stabilized zirconia as described above are extremely useful as an electrode material in a magnetohydrodynamic power production process. Cermets of yttria doped zirconia and cobalt based superalloys prepared by hot pressing the mixed powders have been found to be more stable in a high temperature oxidizing environment if the yttria doped zirconia powder is first given a thin coat of platinum or cobalt by the process described above.

From the above description it will be apparent that many variations may be made in the described subject matter without departing from the scope of the invention as defined in the appended claims. Such variations may include use of percursor metal compounds other than those mentioned and use of refractory ceramics other than those mentioned. Thermal decomposition or reduction conditions may be varied from that particularly described such as by utilizing other reducing environments such as carbon monoxide.

What is claimed is:

1. A cermet neutron absorber containing 2-20 volumepercent metal present as a continuous phase throughout the volume of said neutron absorber, said neutron absorber produced by the process comprising the steps of:

mixing a europium sesquioxide powder and an elemental metal precursor compound to form a solid phase mixture, said elemental metal selected from the group of tantalum, rhenium, tungsten and molybdenum;

decomposing said elemental metal precursor compound within said mixture so as to provide a second mixture comprising said europium sesquioxide powder and said elemental metal in an uncombined state; and densifying said second mixture to provide a cermet neutron absorber having elemental metal present as a continuous phase.

* * * * *